US006597178B1

United States Patent
Nichols et al.

(10) Patent No.: US 6,597,178 B1
(45) Date of Patent: Jul. 22, 2003

(54) SENSOR FOR DETECTING THE MAGNETIC FIELD IN THE AREA OF DOWNHOLE CASING

(75) Inventors: Edward Nichols, Berkeley, CA (US); Ugo Conti, El Cerrito, CA (US); Dzevat Omeragic, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/065,454

(22) Filed: Oct. 18, 2002

(51) Int. Cl.$^7$ .............................. G01V 3/10; G01V 3/18
(52) U.S. Cl. ........................ 324/339; 324/346; 702/11
(58) Field of Search .............................. 324/339, 338, 324/323, 346, 345, 260; 166/250.16; 702/7, 6, 10, 11

(56) References Cited

U.S. PATENT DOCUMENTS

| 6,060,884 | A | * | 5/2000 | Mayer, Jr. et al. ........... 324/321 |
| 6,294,917 | B1 | * | 9/2001 | Nichols ....................... 324/339 |
| 6,393,363 | B1 | | 5/2002 | Wilt et al. |
| 6,534,986 | B2 | * | 3/2003 | Nichols ....................... 324/339 |

OTHER PUBLICATIONS

Ki Ha Lee et al., "Electromagnetic Method for Analyzing the Property of Steel Casing," Lawrence Berkeley National Laboratory, Univ. of Cal. (Feb. 1998).

* cited by examiner

Primary Examiner—N. Le
Assistant Examiner—Subhash Zaveri
(74) Attorney, Agent, or Firm—Kevin P. McEnaney; Brigitte L. Jeffery; John J. Ryberg (57) ABSTRACT

A magnetic receiver with a magnetically permeable core is positioned inside a wellbore casing and operated in a feedback mode to reduce attenuation of a measurable magnetic field. The receiver employs a feedback device to reduce mutual coupling between the core and the casing, which reduces the otherwise normal attenuation of em signals inside the casing. The feedback device may be provided in the form of an extra or feedback winding that effectively cancels the inducing field inside the core and reduces the attenuation otherwise caused by the core-casing interaction. Alternatively, the magnetic receiver may employ, as the feedback device, a current feedback amplifier circuit to cancel the inducing field inside the core. Specifically, the circuit is operated to produce a secondary magnetic field that essentially cancels the inducing field inside the core.

37 Claims, 6 Drawing Sheets

SENSOR FOR DETECTING THE MAGNETIC FIELD IN THE AREA OF DOWNHOLE CASING

BACKGROUND OF INVENTION

The present invention relates generally to the measurement or detection of magnetic fields and, more particularly, to a system, apparatus, and method that utilizes a sensor positioned inside a wellbore casing to measure the magnetic field therein. Alternatively, the present invention relates to the measurement or detection of a magnetic field inside a wellbore casing to determine a property or characteristic of the wellbore casing or wellbore environment.

Subsurface characterization of geologic formation is an important aspect of the drilling of oil and gas wells. Subsurface characterization helps to identify, among other things, the structure and fluid content of the geologic formations penetrated by a wellbore. The formation may contain, for example, hydrocarbon products that are the target of drilling operations. Geologic formations that form a hydrocarbon reservoir contain a network of interconnected fluid paths, or "pore spaces," in which, for example, hydrocarbons, water, etc., are present in liquid and/or gaseous form. To determine the hydrocarbon content in the pore spaces, knowledge of formation characteristics such as porosity and permeability is often required or at least helpful.

Information about the geologic formations and about reservoir characteristics promote efficient development and management of hydrocarbon resources. Reservoir characteristics include, among others, the resistivity of the geologic formation containing the hydrocarbons. Resistivity is generally related to porosity, permeability, and fluid content of the reservoir. Because hydrocarbons are generally electrically insulating and most formation water is electric conductive, formation resistivity (or conductivity) measurements are valuable exploration tools. Moreover, formation resistivity measurements may be used to monitor changes in reservoir hydrocarbon content during production of hydrocarbons.

In many subsurface geophysical exploration techniques, a probe having sensors for measuring various physical parameters at different depths is lowered into a wellbore. In one type of measurement, a magnetic field sensor is used to measure induced magnetic fields and thereby glean information regarding the possible presence of conductive ore bodies. Associated with the magnetic field sensor is a transmitter coil that, when energized, establishes a magnetic field. The magnetic field induces electrical currents in conductive regions, and the induced currents establish a magnetic field that is then measured. By performing such measurements at various depths, it is possible to establish field profiles.

In certain applications, the transmitter coil is a large horizontal loop of wire that is laid out on the surface of the earth in the general vicinity of the wellbore. In other applications, the transmitter coil is a small diameter coil that is lowered into the wellbore, and may be physically located in the same housing as the sensor.

The performance of a magnetic field sensor or magnetic receiver positioned within a wellbore casing may be compromised by the conductive casing's effect on the magnetic field to be measured. Specifically, the measurable magnetic field induces a current that flows concentrically about the receiver coil and tends to reduce the magnetic field within the casing. As will be further explained in the Detailed Description, the measurable magnetic field may be highly attenuated as a result and the measurements made by the receiver may be influenced by variations in attenuation caused by variations in the conductive casing's properties. Often, the design criteria for a crosswell survey of a cased wellbore reduces the magnetic field signal to a level that is undetectable by standard receivers. Moreover, the variance in conductivity, permeability, and thickness along a longitudinal axis of a length of casing makes it difficult to determine an attenuation factor at any selected point. The inability to determine an attenuation factor at a selected point along the casing may cause errors in field measurements that are not easily corrected.

One prior attempt to overcome the adverse effect of the casing on the receiver measurements involves inclusion of a separate small-scale transmitter-receiver within the cased wellbore to measure the casing properties. The measured casing properties are then used to correct the measured crosswell data. See, e.g., Lee et al., Electromagnetic Method For Analyzing The Property of Steel Casing, Lawrence Berkeley National Laboratories, Report 41525, February, 1998.

Another prior attempt to correct or account for the magnetic field attenuation involves positioning a monitor receiver adjacent the transmitter in the cased wellbore. In this manner, the attenuation sensed by, for example, a receiver located in an adjacent wellbore may be predicted. This method is disclosed in U.S. patent application Ser. No. 09/290,156, filed Apr. 12, 1999, entitled Method and Apparatus for Measuring Characteristics of Geologic Formations, and assigned to the assignee of the present invention (hereby incorporated by reference and made a part of the present disclosure).

SUMMARY OF INVENTION

The present invention relates to a magnetic receiver with a magnetically permeable core that is positioned inside a wellbore casing to measure or otherwise detect the magnetic field therein. The receiver employs or includes a feedback means to reduce effect of the casing on the measurable magnetic field ("the casing effect"), i.e., reducing the mutual coupling between the core and the casing, thereby reducing the attenuation of em signals otherwise seen inside the casing. In one embodiment, the feedback means is provided in the form of an extra or feedback winding that reduces the mutual coupling between the core and the casing, thereby effectively reducing or canceling the inducing field inside the core and reducing the attenuation otherwise caused by the core-casing interaction. In an alternative embodiment, the magnetic receiver employs a current feedback amplifier circuit to cancel the inducing field inside the core. Specifically, the circuit is operated to produce a secondary magnetic field that essentially cancels the inducing field inside the core.

As used herein, and for the purpose of fully describing the inventors" contribution to the art , the terms "measure" (or "measurement") and "detect" (or "detection") are synonymous and each shall incorporate the meaning and scope of the other. Similarly, the term "reduce" shall incorporate the meaning of "cancel" with respect to the reduction or cancellation of a magnetic field or casing effect.

In one aspect of the invention, a method of measuring a magnetic field inside a conductive wellbore casing is provided, wherein electromagnetic energy propagates through the casing at a frequency of over about 1 Hz. Such a method includes providing a magnetic receiver having a permeable core and a main winding wound about the core, and incorporating a feedback means with the magnetic receiver. The magnetic receiver is then positioned inside the wellbore casing. Further, electromagnetic energy is generated (e.g., from a transmitter in another wellbore casing) externally of the casing and directed so as to propagate through the casing at a frequency above 1 Hz (and more preferably between about 1 Hz and about 1000 Hz), thereby creating a total magnetic field inside the casing consisting of a primary inducing field and a secondary field inside the casing that generally opposes the primary inducing field. The receiver is then operated in a feedback mode to cancel or reduce at least a portion of the total magnetic field and then to measure the total magnetic field.

In one embodiment, the feedback means includes a secondary winding positioned about the core, and the method includes amplifying the output of the main winding and feeding the amplified output back through the secondary winding. The output is amplified and fed such that a core flux generated by the second winding is generally in opposition to a core flux generated by an external field, thereby substantially canceling the flux in the core. Further, the amplified output is fed back such that a feedback current is driven through the feedback winding and is generally linearly proportioned to the secondary magnetic field.

In another respect of the invention, a method is disclosed for reducing attenuation of the magnetic field that is otherwise caused by a mutual coupling of the core with the casing. This inventive method is employed in conjunction with or in relation to a method of employing a magnetic receiver positioned within a conductive casing to measure an inducing magnetic field therein, wherein the receiver has a permeable core and a main winding thereabout.

BRIEF DESCRIPTION OF DRAWINGS

The invention is described in conjunction with the accompanying drawings, in which.

DETAILED DESCRIPTION

Figure 1:
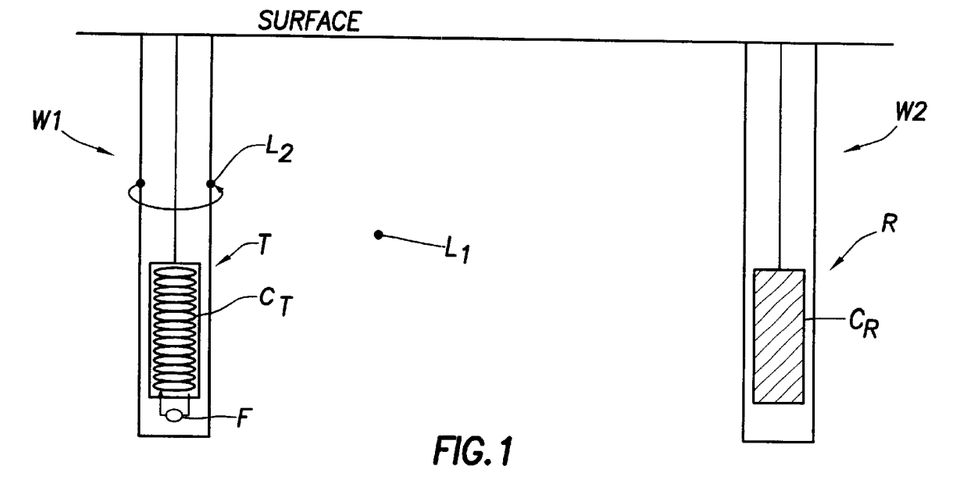
FIG. 1 is a schematic of a wellbore environment and a system provided therein, for measuring magnetic fields.

FIG. 1 depicts a system for measuring formation resistivity between two wellbores. The system is particularly suited for incorporating a system and apparatus for measuring magnetic fields within a wellbore and for use with a method of measuring magnetic fields, according to the invention. A transmitter T is located in one wellbore W1 and consists of a coil $C_T$ having a multi-turn horizontal loop (vertical solenoid) of N1 turns and an effective cross-section $A_T$. The multi-turn horizontal loop carries an alternating current $I_T$ at a frequency of $f_0$ Hz. In free space, the multi-turn horizontal loop produces a time varying magnetic field $B_0$. The magnetic field $B_0$ is proportional to a magnetic moment $M_T$ of the transmitter T and to a geometric factor k1. The magnetic moment $M_T$ of the transmitter T can be defined as follows: $M_t = N_T I_T A_T$ In free space, the magnetic field $B_0$ can be defined as follows: $B_0 = K_1 M_T$ The geometric factor k1 is a function of a spatial location and orientation of a component of the magnetic field $B_0$ measured by a receiver R.

The receiver R is located some distance from the transmitter T and is shown disposed in a different wellbore W2. The receiver R includes a loop of wire (e.g., a coil $C_R$ having $N_R$ turns wound about a core of high magnetic permeability metal such as ferrite, mumetal strips, or some other known composition. As will be explained below, the receiver R according to the invention is provided with a feedback means F for reducing the attenuation of the measurable magnetic field $B_R$. The time-varying magnetic field $B_R$ sensed by the receiver R, and having a frequency $f_0$, creates an induced voltage $V_R$ in the coil $C_R$ which is proportional to $B_R$, the frequency $f_0$, the number of turns of wire $N_R$, an effective cross-sectional area of the coil $A_R$, and an effective magnetic permeability $\mu_R$ of the coil $C_R$.

From the foregoing, $V_R$ can be defined as follows: $V_R = f_0 B_R N_e A_R \mu_R$ By simplifying the above equation, $V_R$ may be written as follows: $V_r = k_r B_r$ where $k_r = f_0 N_R A_R \mu_R$ The product $A_R \mu_R$ may be difficult to calculate. To accurately determine $A_R \mu_R$, $C_R$ is calibrated in a known magnetic field and at a known frequency to determine an exact value for $k_R$. Thereafter, the magnetic field $B_R$ sensed by the receiver R is related directly to the measured voltage $V_r$ by the following equation: $B_R = V_R / k_R$ When the system is placed in a conductive geologic formation, the time varying magnetic field $B_0$ produces an electromagnetic force (EMF) in the geologic formation that in turn drives a current therein, shown schematically as L1 in FIG. 1. The current L1 is proportional to the conductivity of the geologic formation and the flow of the current L1 is generally concentric about the longitudinal axis of the wellbore W2. The magnetic field proximate the wellbore is a result of the free space field $B_0$, called the primary magnetic field, and the field produced by the current L1 is called the secondary magnetic field.

The current L1 is typically out of phase with respect to the transmitter current $I_r$. At very low frequencies, where the inductive reactance of the surrounding formation is small, the induced current L1 is proportional to dB/dt and is, consequently, 90° out of phase with respect to $I_r$. As the frequency increases, the inductive reactance increases and the phase difference increases.

The second magnetic field detected by the receiver R is caused by the induced current L1 and also has a phase shift to that the total magnetic field at the receiver R is complex in nature. The total magnetic field has a component $B_r$ in phase with the transmitter current I (referred to as a real component) and a component $B_1$ phase shifted by 90°

(referred to as the imaginary or quadrature component). The values of the real $B_r$ and quadrature $B_i$ components of the magnetic field at a given frequency in a geometric configuration uniquely specify the electrical resistivity of a homogeneous formation penetrated by the wellbores. In a non-homogeneous geologic formation, the complex magnetic field is generally measured at a succession of points along the longitudinal axis of the receiver wellbore for each of a succession of transmitter locations. The multiplicity of T-R locations suffices to determine the non-homogeneous resistivity between the wellbores as described in various prior art literature.

As discussed above, in an installation such as that provided in FIG. 1, the conductive casing may present measurement problems. Electromagnetic (EM) energy may still propagate through the casing with only moderate attenuation (e.g., less than 60 dB) provided the operating frequencies are less than a few hundred Hz. At higher frequencies, however, the steel, aluminum, or other conductive casing acts as a barrier to EM energy by two effects. First, the change of magnetic field induces strong currents to flow in the varied conductive casing. These currents create a secondary magnetic field which tends to oppose the inducing field. Thus, the net effect is that the total magnetic field (primary plus secondary) is reduced. Secondly, because most casings are magnetically permeable, this permeability pulls the magnetic field lines into the casing and reduces the field lines interior to the casing.

With respect to the present inventive method of measuring the external magnetic field, or more particularly, the method of reducing attenuation of the measurable magnetic field, these undesirable effects are referred to as the "casing effect."

In one aspect of the present invention, a method is employed to reduce the casing effect, i.e., on the performance of a system such as that illustrated in FIG. 1 or, more particularly the performance of the magnetic receiver R. To facilitate the description of this and other inventive methods, however, a brief discussion of the magnetic receiver R is first provided.

Figure 2:
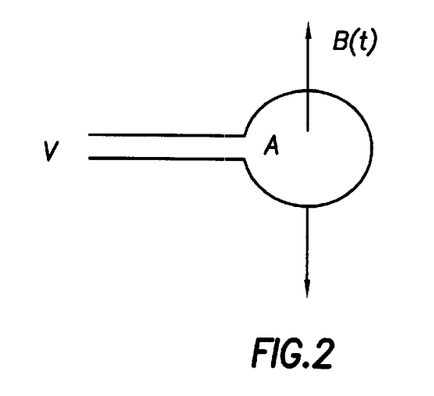
FIG. 2 is a schematic illustrating the basic physics underlying the operation of an induction coil.

A magnetic receiver, such as that which is employed in the present inventive method, is one type of induction coil. The physics underlying the operation of the induction coil is illustrated in FIG. 2. When a single circular loop of area, A, is placed in a time-varying magnetic field, B(t), an emf (voltage) is induced in the loop that is equal to the negative time rate of change of magnetic flux, $\phi$ passing through the loop. The flux is the product of the magnetic induction B and the area of the loop, A. Thus, we have: Equation 1. Faraday's Law $$emf, V, = \frac{-\partial \Phi}{\partial T} = -A\frac{\partial B}{\partial T}$$

If there are N turns of wire on the loop, the output voltage is multiplied by N, that is:

$$emf, V, = -NA\frac{\partial B}{\partial T}$$

This relationship is known as Faraday's Law.

The invention also relates to utilizing the performance characteristics or response of a suitable magnetic receiver in a wellbore casing environment to determine or evaluate properties of the wellbore casing, as will be further explained herein.

It is customary to describe the time dependence as sinusoidal, given by $e^{i\omega t}$, where $\bar{\omega}$ is the angular frequency in radians ($\bar{\omega}=2\pi f$, and f is in Hertz), and thus:

$$emf, V_i = -i\bar{\omega}NABe^{i\bar{\omega}_t} \qquad \text{Equation 3}$$

The earliest magnetic induction sensors were simple induction coils connected to galvanometers that measured the current that flowed when coil output was essentially short-circuited. The current output was easily measured at low frequencies, less than one Hz, but the mechanical response of the galvanometer precluded use of the galvanometer at higher frequencies. With the advent of electronic amplifiers, it has become more practical to measure the voltage produced by the coil. Since the em f is proportional to the magnetic induction threading of the coil, it is desirable to increase the flux by inserting a high permeability material within the winding. This has the effect of increasing the effective cross-sectional area of the coil, thus, reducing the size (diameter) of the loop for a given voltage produced. This effect is, therefore, incorporated into the system of the present invention.

With a permeable core, the flux is concentrated within the windings. Because of demagnetizing effects, the flux is increased by an effective permeability, $\mu_{eff}$, that is always less than the true permeability of the material, $\mu_{true}$. The coil output is now written as: Equation 4

$$emf, V, = -\mu_{eff}NA\frac{\partial B}{\partial T}$$

or $$emf, V_i = -i\bar{\omega}\mu_{\bar{\omega}}NABe^{i\bar{\omega}_t}$$

Figure 3:
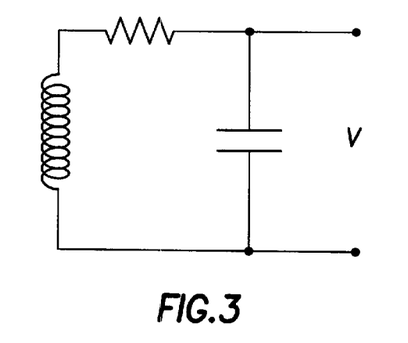
FIG. 3 is a simplified circuit diagram of an induction coil.

The effective permeability approaches the true permeability as the length to diameter ratio of the core increases. To utilize the benefits of a permeable core, long thin coils are preferable to short fat designs. The windings of a multi-turn coil, more properly called a solenoid since the coil is elongated to take advantage of the length required to get a high $\mu_{eff}$, have an appreciable inter-wire capacitance that basically acts as a parallel reactance to the self inductance of the coil and the winding resistance. The equivalent circuit for a typical induction coil is shown in FIG. 3.

A practical coil is therefor characterized by self-inductance, L, resistance, R, and a capacitance, C, which depend on the effective permeability, the number of turns, diameter, resistivity, and total length of wire and more subtly on the geometry of the winding. The overall design objective is to increase the ratio of voltage output to system noise subject to constraints on weight and size (length) of the coil. The system noise is in turn dictated by the inherent electronic noise of the coil (Johnson noise) and the core material, and by the noise of the amplifier to which the coil is attached.

For higher frequencies, the distributed capacitance of the coil windings, C, has a pronounced effect on the response effectively shorting the output, V. It also introduces a self-resonance in the coil at the resonant frequency $$\omega_0 = 1/\sqrt{LC}$$

which has the advantage of boosting the output at the resonant frequency but the disadvantage of introducing a rapidly varying phase response in the vicinity of the resonance. This characteristic tends to be highly variable in the field because of the small mechanical distortions introduced by temperature changes, which in-turn change the capacitance. Modern design criteria requires the response to be maximized in a band of interest. Thus, a primary objective in the winding design is to minimize the capacitance while providing a sufficient number of winding turns to provide adequate voltage at the output of the amplifier.

An important aspect in the design of an induction coil, according to the invention, is matching a coil with an amplifier. Due to the restrictions of stateelectronics, the amplifier is preferably designed first. A complete description of the design elements for a multi-turn solenoid induction coil is provided in Hill and Bostick (1962) (hereby incorporated by reference). After optimizing the receiver design in terms of size and physical incorporation with a possible front-end amplifiers, the problem of casing effect attenuation is addressed. As alluded to above, the output sensitivity of the coil/amplifier system is affected in unpredictable ways by the presence of the conductive casing (usually steel or aluminum). FIGS. 5–8 illustrate systems and methods which address this problem, according to the invention.

Figure 5:
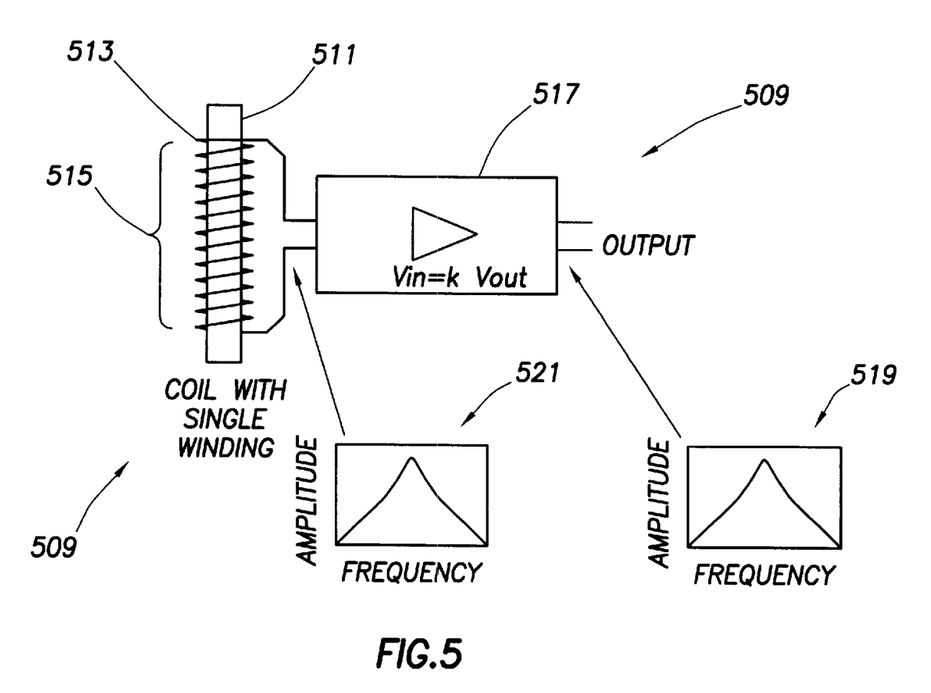
FIG. 5 is a simplified schematic of magnetic receiver system suitable for use with a method according tot he invention.

FIG. 5 depicts a schematic of a basic magnetic receiver system 509 comprising a highly permeable core 511 and a main winding 513 disposed about the core 511 to form an induction coil 515. As shown therein, the terminals of the winding 513 are coupled with or to the input of an operational amplifier 517, or more preferably, a coil preamplifier. Further embodiments of the inventive system may employ a center-tapped winding so as to reduce electrostatic pickup.

In one aspect of the invention, a novel, more advantageous method of measuring magnetic fields within a well casing is devised utilizing steps for reducing casing effect on the measurement of the magnetic field. In another aspect of the invention, a novel, more effective method or methodology is employed to address the attenuation problems in these measurements. For example, a method is devised based, at least partly, on the theory that, if the receiver system (e.g., coil plus amplifier) experiences large response changes due to casing variations, a novel, advantageous method of reducing or canceling casing effect may be obtained by measuring and testing various coil/amplifier combinations. Furthermore, various combinations may be employed to quantify the response changes and to correlate these changes with properties of the casing. For example, the response changes of a coil/amplifier combination may be quantified and recorded for varying casing properties such as corrosion wear or wall thickness, thereby establishing a means for correlating the system response (in the field) with values of or deviations in the casing properties.

Figure 4:
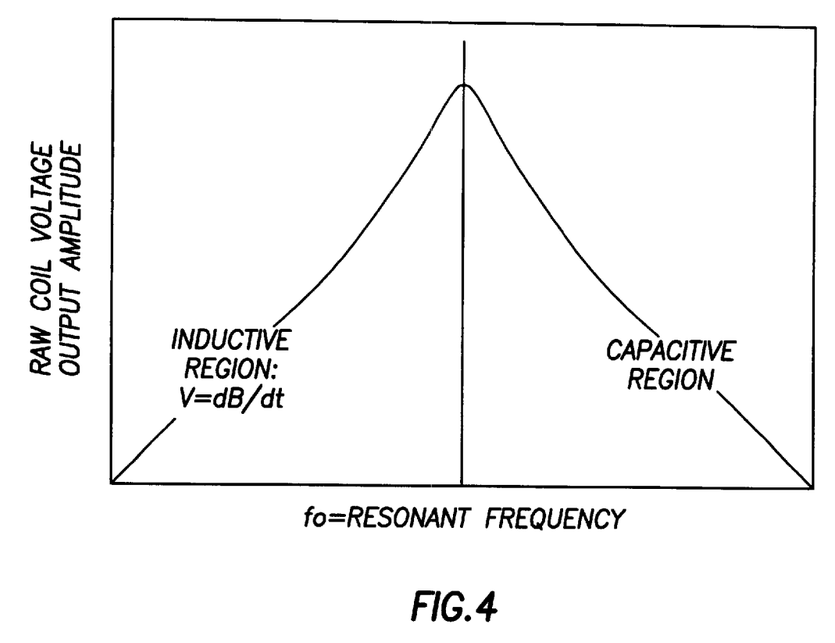
FIG. 4 is a graphical illustration of the spectral response for a raw induction coil.

FIG. 4 depicts the response of a typical raw coil amplitude spectral response. In a first exemplary method, the voltage generated at the terminals of the coil winding 513 is amplified in a linear fashion with minimal filtering. The resulting coil response as a function of frequency at the output of the preamplifier 519 follows closely the raw output of the coil winding 521 and displays an inductive rise, resonant peak and capacitive decay which are evident in the raw output. Applicants have found that this first exemplary method is less suitable (than other methods described later) for low frequency inductive antennas because the phase stability of the response around the resonance is relatively poor and the higher output at certain frequencies (e.g., 60 Hz) may create dynamic range problems.

In a second exemplary method, the problem of high phase variability and stability through the resonant frequency is alleviated by incorporating a feedback winding around the main sensing solenoid and using the output voltage to drive a current in this feedback winding, thereby effectively nulling the change in coil output. A complete description of the design and properties of feedback coils is provided by Clerc (1971) (hereby incorporated by reference).

Figure 6:
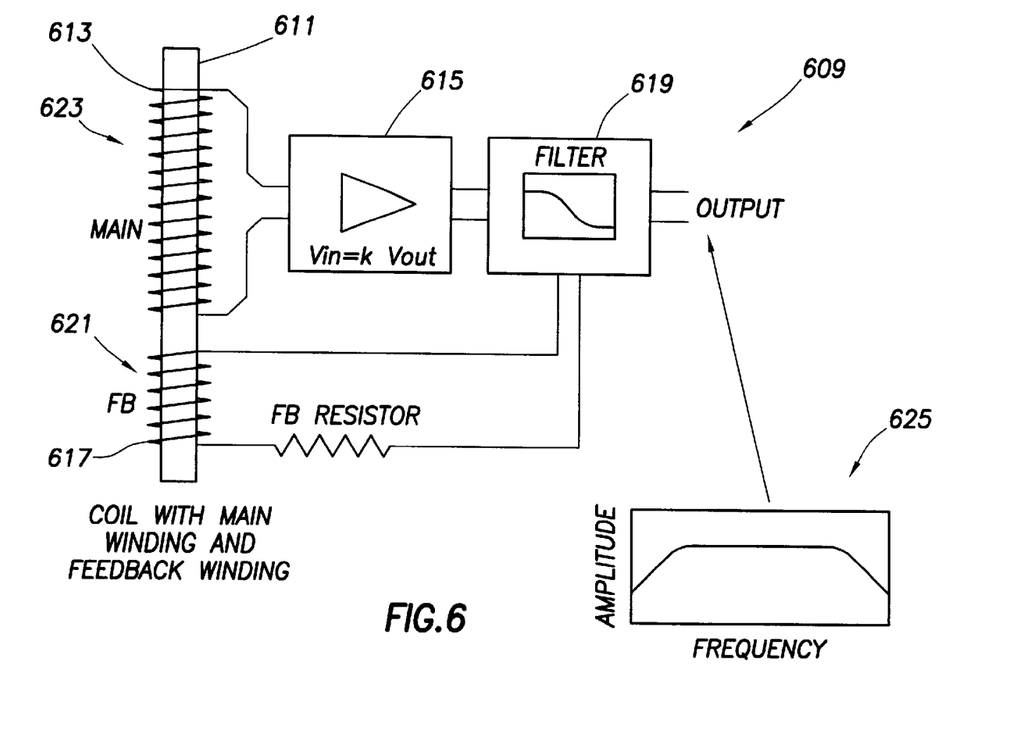
FIG. 6 is a simplified schematic of an alternative magnetic receiver system suitable for use with a method according to the invention.

FIG. 6 depicts, in a simplified schematic, a magnetic receiver system 609 suitable for use with the inventive method. The magnetic receiver system 609 includes a highly permeable magnetic core 611 around which a main winding 613 is disposed (to form a main coil 623). In this receiver system 609, the main winding or coil 613 is coupled to the input terminal of an operational amplifier 615 (e.g., an AD743 model available or accessible through Analog Devices, Inc.). Further, a second or feedback winding 617 is also positioned about the core 611 (to form a feedback coil 621). Preferably, the amplifier 615 is also connected with a filter 619 which is connected with the feedback coil 621 (via an FB Resistor 641) and provides an output signal thereto. The amplifier 615, feedback coil 621, FR Resistor 641, and the filter 619 may, at least in this instance, be referred to as a "feedback means."

In the feedback mode of the magnetic receiver system 609, the feedback current is driven through the feedback winding in a direction opposite to the current flow in the main winding 613 (e.g., opposite the flow direction from/or between the winding 613 and the input to the amplifier 615). The feedback current is therefore proportional to the secondary magnetic field in the core rather than its time derivative, and as a result, another magnetic field is generated in the core that opposes (and thereby essentially cancels) the secondary field in the core. Thus, the main coil 623 becomes a null detector in the feedback mode. Moreover, because the feedback current is fed back to the receiver (in an opposite direction to the input of the amplifier), the amplifier noise is also reduced by the same ratio that the secondary magnetic field inside the core is reduced. As a result, the signal-to-noise ratio of the "unfeedbacked" is preserved.

Figure 7:
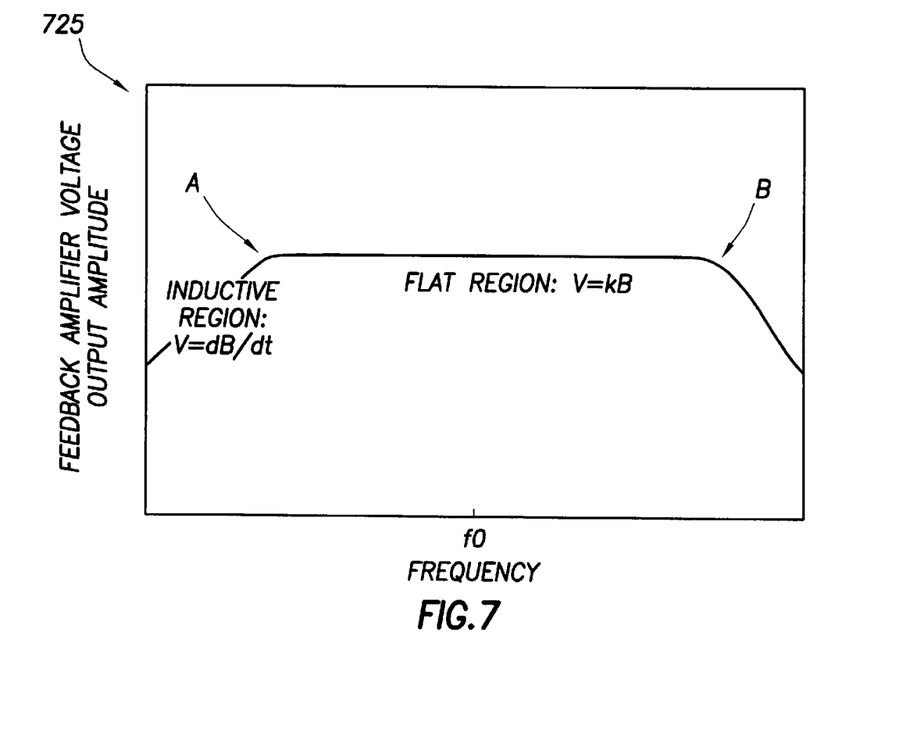
FIG. 7 is a graphical illustration of the spectral response for the system of FIG. 6.

In the band of interest, the sensor acts as a magnetometer because its output is proportional to the secondary magnetic field rather than its time derivative. The usual spectral response 525 of such a feedback coil is shown in FIG. 7, which is characterized by a knee "A", a knee "B", and wide flat region 625a therebetween. The knee "A" is defined by the low frequency amplification of the amplifier and is independent of the resistance of the main winding. The knee "B" is defined by the amplification at high frequency. The shape of the filter in the feedback loop is thus defined by the required bandwidth and the need to avoid high frequency oscillations.

As shown in FIG. 7, the inventive sensor utilizes the magnetic feedback design to provide a stable flat response over several decades of frequency. Both the amplitude and phase responses are highly stable with variations of less than 0.1 dB in amplitude and +/−1.0 degree in phase between sensors. For frequencies below the flat response region, the sensor response is proportional to signal frequency so that the sensor acts as a dB/dt detector. The magnetic field feedback technique, according to the invention, also provides for long term and thermal stability of the sensors.

Figure 8:
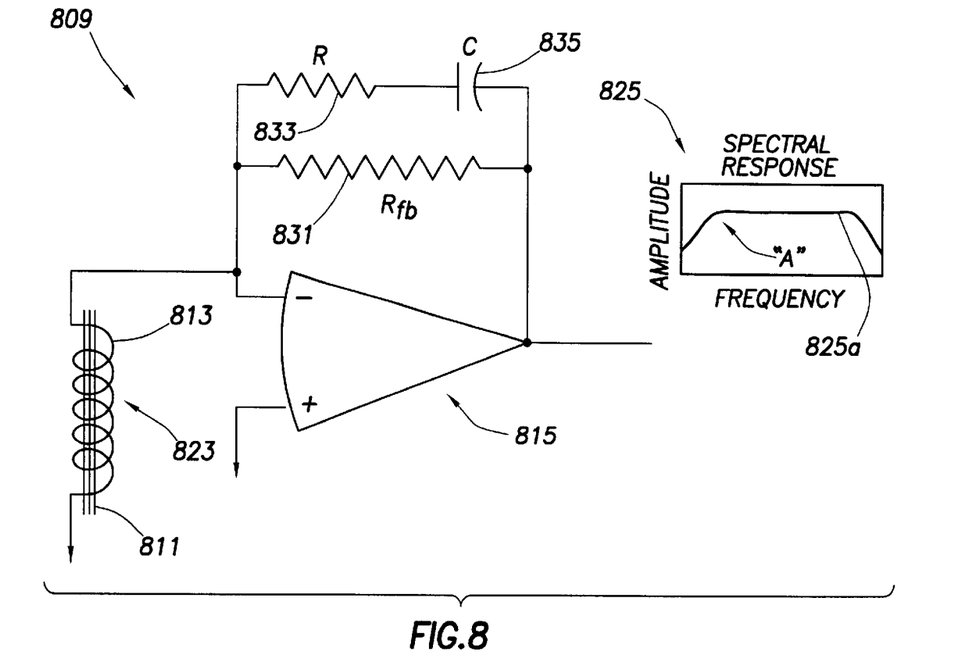
FIG. 8 is a simplified schematic of another alternative magnetic receiver system suitable for use with a method according to the invention.

An alternative method for attenuating the impact of the conductive casing may be referred to as the current amplification method. FIG. 8 depicts a schematic of an exemplary magnetic receiver system 809 suitable for use with this inventive method. FIG. 8 also provides an illustration of the spectral response 825 for the system 809. The receiver system 809 includes a permeable core 811 and a winding 813 disposed about the core 811, thereby forming coil 823.

The system 809 is further equipped with a feedback means that may be referred to as including amplifier 825 and the feedback circuit comprising feedback Resistor, $R_{fb}$ 831, and the combination of resistor 833 and capacitor 835.

The operational amplifier 825 in FIG. 8 is set up as a current amplifier. As shown therein, one terminal for the winding 813 is coupled to an input of the operational amplifier 825 and the feedback circuit comprising resistor, $R_{fb}$ 831, resistor 833 and capacitor 835 is coupled between the input and output of the amplifier 825. Thus, the coil 823 is virtually shorted in the amplifier 825 and the current output from the amplifier 825 may be fed back from the amplifier 825 to the coil 823 through the feedback circuit (but in the opposite direction). The gain of the feedback current may be set through manipulation of values of R and/or $R_{fb}$.

The electromagnetic field generated in the coil 823 by the external magnetic field causes a current to circulate in the shorted coil 823. This current generates a flux in the receiver core 811 that is in opposition to the externally generated flux. When this current is translated into a voltage output in the current amplifier 823, the net result is an output spectral response similar to the response of the feedback amplifier of FIG. 6 with a wide flat region 825a. The main difference is that the knee "A" is defined by the ratio of the resistance ($R/R_{fb}$) and the inductance of the coil 823. The response below the knee is therefore dependent on the resistance of the winding wire, which is highly dependent on temperature. It is important to note that the feedback circuit operates to eliminate the possibility of oscillations at the higher frequencies due to the complex frequency response of the coil 823 beyond its primary resonant peak. Despite the perceived or otherwise expected disadvantage, this inventive method of reducing the attenuation of the measurable magnetic field may be employed successfully by designing the amplifier so that the knee "A" is below the frequency band of interest for all temperatures.

In any event, the system of FIG. 8 provides a feedback current that flows through the main winding 813 in the opposite direction, thereby canceling or otherwise reducing the secondary magnetic field in a manner similar to that provided with the system of FIG. 6. As a result, the magnetic field measured by the receiver is smaller (i.e., the attenuation is reduced). In both of the above inventive methods (i.e., FIGS. 6 and 8), the input noise of the amplifier is advantageously fed back to the receiver, with the opposite sign to the input of the amplifier. This results in a reduction of the amplifier noise by the same ratio as the secondary magnetic field (in the core) is reduced. In this manner, the signal to noise ratio of the "un-feedbacked" system is preserved.

Figure 9:
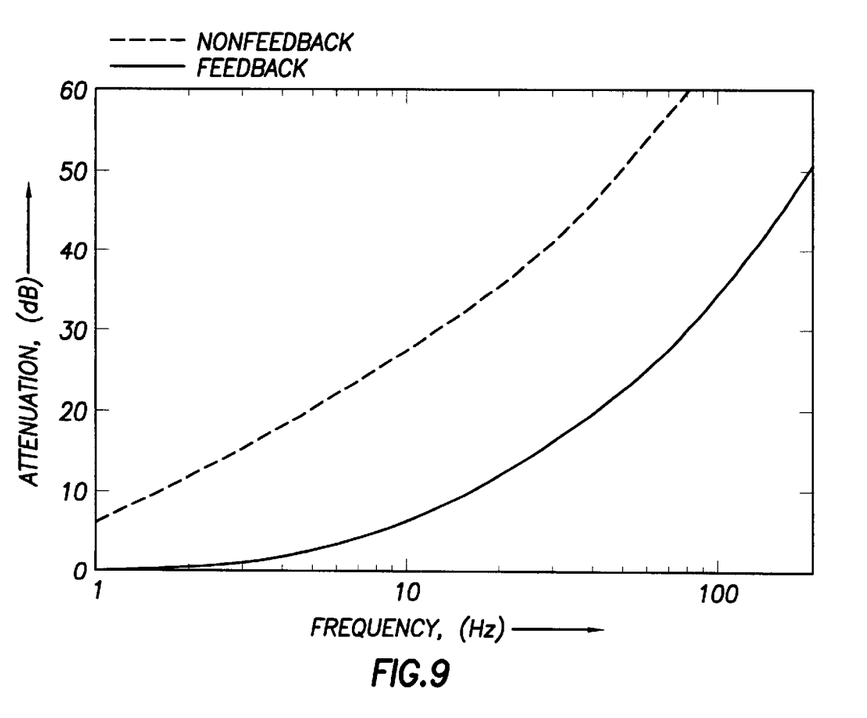
FIG. 9 is a performance chart for the inventive system and method indicating an attenuation change response for a receiver-casing combination.
Figure 10:
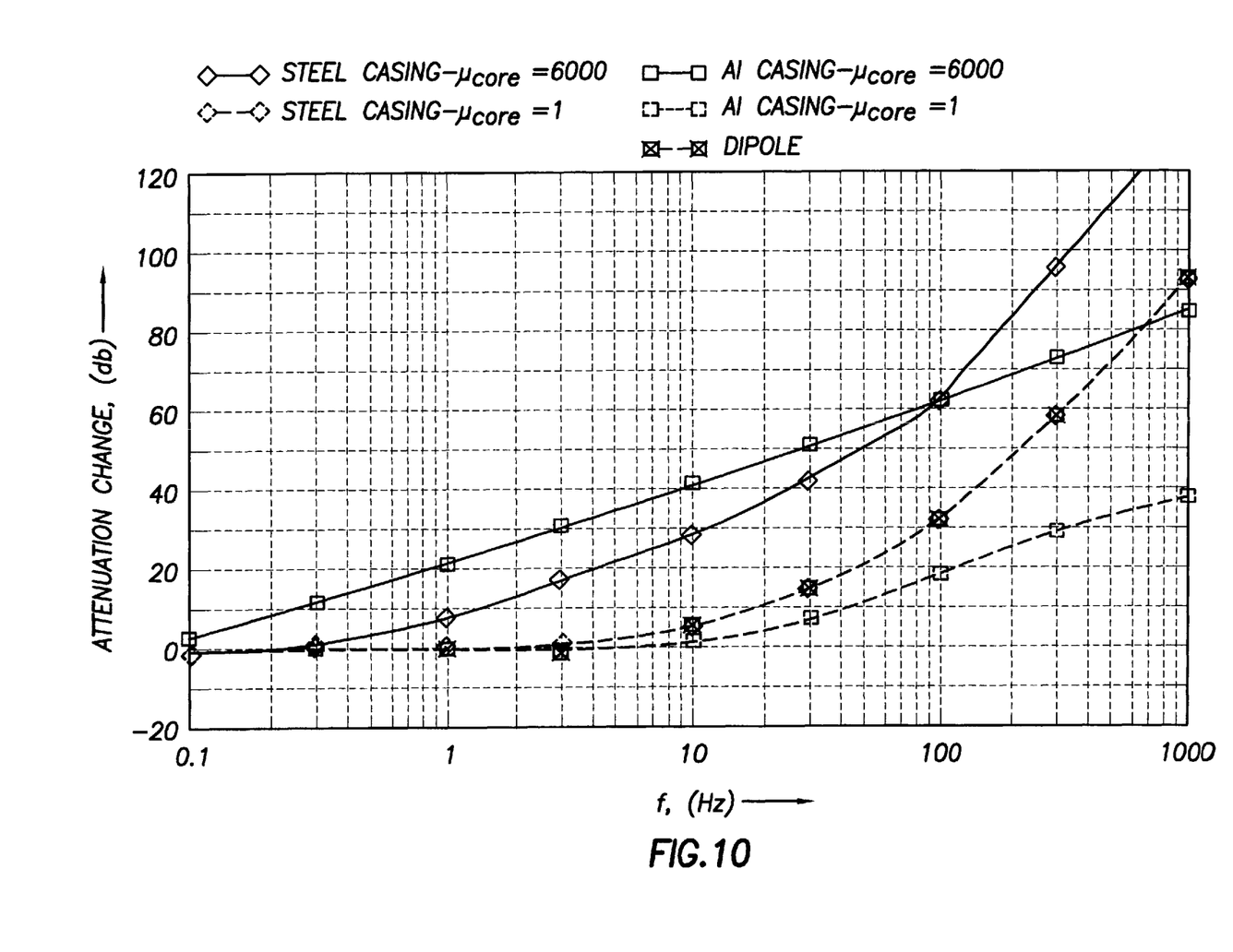
FIG. 10 is a performance chart depicting multiple attenuation change response curves.
Figure 11A:
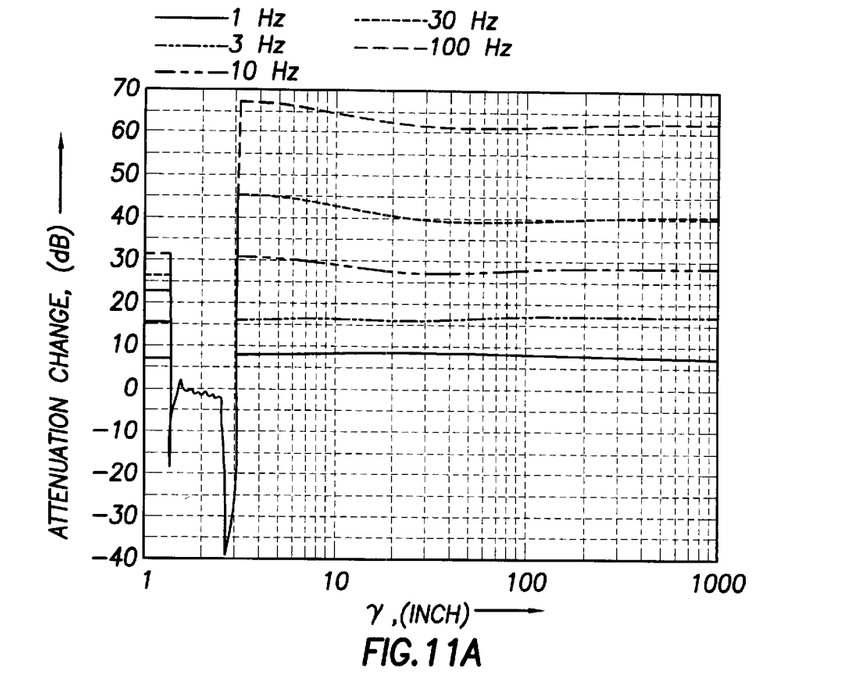
FIG. 11 is yet another performance chart indicating the response of various systems at various frequencies.
Figure 11B:
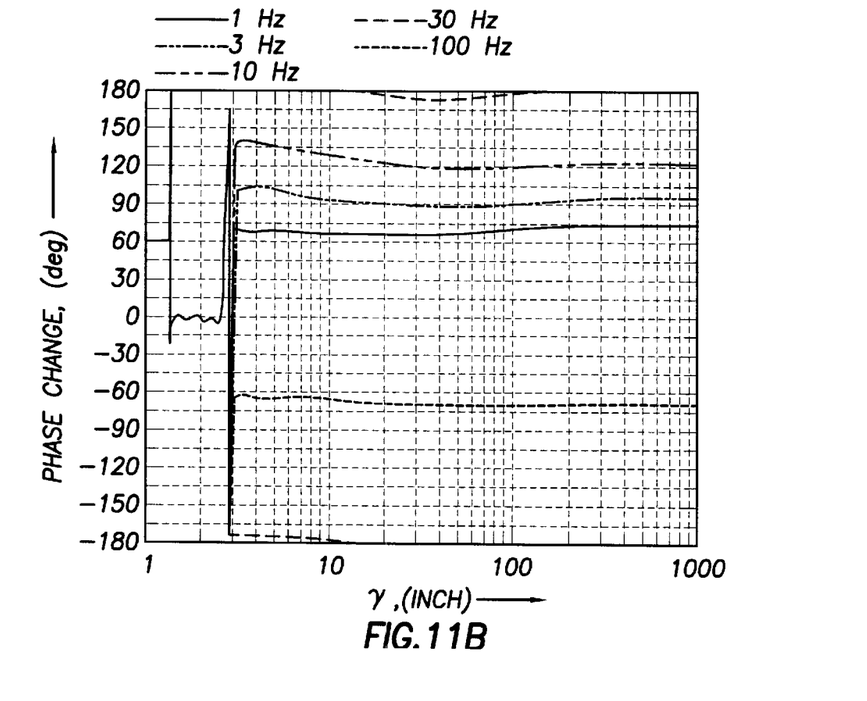

FIGS. 9–11 are performance charts illustrating the performance of the inventive system and method (i.e., particularly the system of FIG. 6). FIG. 9, in particular, illustrates the reduced attenuation of the measured magnetic field (due to the casing effect) obtained through use of the system in a ⅜" thick steel casing. The dashed curve indicates the normal attenuation at various frequencies of the EM energy without use of the inventive system and method. The solid curve indicates the reduced attenuation for the same casing as a result of the inventive system and method. The difference between the two curves may be referred to as the attenuation change. Preferably, the values of both curves are based on a theoretical non-attenuated value or response for the receiver system. Such a baseline response may be derived from the classical method of measuring the voltage output of the system when the system is immersed in a known, spatially constant magnetic field in air. These measurements may be performed over a range of frequencies, so as to generate a full spectral response of the system in air.

In one aspect of the invention, the invention provides a method for detecting and/or quantifying the reduced attenuation and/or attenuation change for a particular casing and wellbore environment. In this respect, the chart of FIG. 9 may be referred to as providing the attenuation change response for a particular casing/wellbore environment to a particular magnetic receiver system (more specifically, a feedback means induction coil combination), according to the invention. Such a response is a unique property of the casing and wellbore environment that has not been considered, accounted, or contemplated in the prior art. More importantly, as a unique, measurable in-situ property of the casing, this property provides useful information on the condition and attributes of the casing and wellbore environment.

To elaborate, the system and method according to the invention provides, as a further aspect of the invention, the capability of measuring the magnetic field with normal attenuation and with reduced attenuation. More particularly, the inventive system and method provides or allows for measurement of the measurable magnetic field in both a feedback and non-feedback mode.

FIG. 10 provides the response curves for various steel casing/magnetic receiver. system combinations. In FIG. 10, the attenuation change values are indicated at various frequencies. The "dipole" curve provides the theoretical attenuation experienced with a non-magnetic core receiver. The response curves-or models may be obtained experimentally and developed for the various magnetic receiver/casing combinations of interest. In the field, the attenuation change values may be measured by operating the magnetic receiver system in both the feed back and non-feedback modes, and at varying frequencies (obtained through operation of the transmitter). In this manner, the actual attenuation change response curve of the casing and casing environment is obtained and may then be compared against the expected or baseline response provided in the model charts (e.g., FIG. 10). Alternatively, one or more non-magnetic core receivers may be employed in conjunction with the receivers with feedback means.

FIG. 11 provides the response for various receiver-casing combinations. In particular, FIG. 11 shows the casing effect observed over a frequency range for the various combinations.

This type of monitoring will reveal, among other things, deviations of the actual attenuation response from the expected or baseline response. The deviations may then be correlated with certain physical properties of the casing and the wellbore environment. For example, some deviations or patterns may indicate variations in casing wall thickness, corrosion wear concentrations, concentrations of reduced resistivity, etc. Preferably, such abnormalities in the casing properties may be easily recognized through modeling and generation of the proper response curves to accompany the response curves of FIG. 10.

Preferably, the number for the receiver main winding is determined by the noise considerations and the predicted self-resonance frequency. The latter determines the frequency band of least noise.

The design of the winding becomes an iterative process because the choice of amplifier determines the input current noise that produces a voltage noise through the inductance of the coil, which depends on the number of turns. Because random noises add by the Square Root Law, the best noise performance of the system is obtained by making all the noise contributions roughly equal. To simplify this process, the specifications of the front-end amplifier have been chosen because the inductance of the coil is from 200 to 1000 Henrys.

In a preferred embodiment, a device referred to as the AD 745 is employed. This device is commercially available or accessible through Analog Devices, Inc. At 50 Hz, its voltage noise is 5

$nV/\sqrt{Hz}$ and its current noise is 7

$fA/\sqrt{Hz}$.

This current noise translates to a voltage noise of 4.4

$nV/\sqrt{Hz}$ for an inductance of 1000 Hz at 100 Hz.

This also addresses the Johnson noise of the resistance of the winding. Applicants first considered 16000 turns and then 64000 turns. Further considering the available space and the required mechanical strength, wire #26 suits best for this application.

With an average turn diameter of 2.3", the total wire length needed is 10 and 40 kft respectively for the two windings. The winding resistance is 400 ohms and 4 kohms. These correspond to a Johnson noise of 2.5 and 8

$nV/\sqrt{Hz}$.

These noise values are acceptable compared to the other noise contributions previously described.

The foregoing detailed description of the invention has been presented for purposes of illustration. It is to be noted that the description is not intended to limit the invention to the system, apparatus, and method disclosed herein. Various aspects of the invention as described above may be applicable to other types of measurement or detection apparatus, systems, and methods. For example, the attenuation methods described above may be employed in connection with other magnetic field measurement systems or other measurement environments, or maybe modified or combined to obtain results particularly advantageous in a measurement application. Further, the attenuation methods (or the system described herein) may be incorporated into or utilized in methods of measuring or detecting certain properties of wellbore casing or wellbore environment. Such variations of the invention will become apparent to one skilled in the relevant measurement, geophysical, or engineering art who is provided with the present disclosure. Consequently, variations and modifications commensurate with the above teachings and the skill and knowledge of the relevant art, are within the scope of the present invention. The embodiments described and illustrated herein are further intended to explain the best modes for practicing the invention, e.g., which magnetic receivers systems are particularly suited for use with the inventive method, and to enable others skilled in the art to utilize the invention in other embodiments and with various modifications required by the particular applications or uses of the present invention.

What is claimed is:

1. A method of measuring a magnetic field inside a conductive wellbore casing, wherein electromagnetic energy propagates through the casing at a frequency of over about 1 Hz, said method comprising the steps of:

providing a magnetic receiver having an induction coil of a permeable core and a main winding wound about the core;

incorporating a feedback means with the magnetic receiver;

positioning the magnetic receiver inside the wellbore casing;

generating electromagnetic energy externally of the casing and directing the electromagnetic energy so as to propagate through the casing at a frequency over 1 Hz, whereby a measurable total magnetic field inside the casing is measurable at an attenuated state due to a casing effect, the casing effect resulting from the interaction between the casing and the permeable core; and operating the receiver in a feedback mode, so as to reduce the casing effect from the interaction between the casing and the core and to reduce attenuation of the total magnetic field caused by the casing, effect, thereby measuring a measurable total magnetic field inside the casing with reduced attenuation.

2. The method of claim 1, wherein the step of generating electromagnetic energy generates a measurable total magnetic field inside the casing that includes a primary magnetic field and a secondary field inside the core that generally opposes the primary field, and wherein the step of operating the receiver includes reducing at least a portion of the total magnetic field, thereby reducing attenuation of the measurable total magnetic field.

3. The method of claim 2, wherein the step of operating the receiver includes canceling at least a portion of the total magnetic field by canceling at least a portion of the secondary magnetic field.

4. The method of claim 2, wherein the step of operating the receiver includes driving a feedback current through a coil of the receiver to generate a magnetic field that generally opposes the secondary magnetic field, thereby reducing the secondary magnetic field.

5. The method of claim 4, wherein the step of operating the receiver includes driving the feedback current in a feedback direction through the main winding.

6. The method claim 4, wherein the feedback means includes a secondary winding about the core, the step of operating the receiver including driving the feedback current in a feedback direction through the coil formed by the secondary winding wound about the core.

7. The method of claim 2, wherein the step of incorporating a feedback means includes providing an operational amplifier, the method further comprising the step of: coupling the main winding with an input of the amplifier, such that the step of operating the receiver includes driving a feedback current output of the amplifier through a coil of the receiver to generate a magnetic field that generally opposes the secondary magnetic field.

8. The method of claim 7, wherein the receiver includes a secondary winding about the core, and the step of driving the feedback current output includes driving the feedback current through the secondary winding, whereby the phase of the feedback output is such that a secondary core flux generated by the secondary winding is generally in opposition to a primary core flux generated by the primary magnetic field, thereby substantially canceling the primary core flux in the core.

9. The method of claim 7, wherein the receiver includes a secondary winding about the core, and the step of driving the feedback current output includes driving the feedback current through the secondary winding in a direction opposite the direction from the main winding to the input to the amplifier.

10. The method of claim 7, wherein the step of driving the feedback current includes driving the feedback current through the main winding in a direction opposite the direction from the main winding to the input to the amplifier.

11. The method of claim 7, wherein the step of driving the feedback current includes driving the feedback current through the main winding in a direction opposite the input to the amplifier, thereby canceling amplifier noise generated in the magnetic receiver.

12. The method of claim 7, wherein the step of driving a feedback current output includes a driving a feedback current that is generally linearly proportional to the secondary magnetic field, and such that the induction coil operates as a null detector.

13. The method of claim 1, wherein the step of incorporating a feedback means includes providing an operational amplifier, the method further comprising the step of: coupling the induction coil with an input of the amplifier, such that the step of operating the receiver includes driving a feedback current output of the amplifier back to the receiver, whereby the phase of the feedback output is such that a core flux generated by the feedback current through a coil of the receiver is generally in opposition to a core flux generated by an external field, thereby substantially s canceling the flux in the core.

14. The method of claim 1, wherein the step of generating the electromagnetic energy includes propagating the electromagnetic energy at a frequency between about 1 Hz and about 1000 Hz.

15. The method of claim 1, further comprising the step of positioning a transmitter at a second wellbore casing located a distance from the first well bore casing, wherein the step of generating electromagnetic energy includes operating the transmitter.

16. The method of claim 1, further comprising the step of operating the receiver in a non-feedback mode, so as to measure the measurable total magnetic field in the attenuated state.

17. The method of claim 16, further comprising the steps of: determining the attenuation change attributable to the casing by comparing the measured value of the measurable total magnetic field in the attenuated state with the measured value of the measurable total magnetic field with reduced attenuation.

18. The method of claim 17, further comprising the steps of: repeating the step of generating electromagnetic energy at a plurality of frequencies; and at each of the plurality frequencies, repeating the steps of, operating the receiver in a feedback mode, operating the receiver in a non-feedback mode, and determining the attenuation change.

19. The method of claim 17, further comprising the step of modeling the attenuation change response of the casing and receiver combination, and generating an actual attenuation response curve by repeating the step of generating electromagnetic energy at a plurality of frequencies; and at each of the plurality frequencies, repeating the steps of, operating the receiver in a feedback mode, operating the receiver in a non-feedback mode, and determining the attenuation change.

20. In a method of positioning a magnetic receiver within a conductive casing to measure a total magnetic field induced therein as a result of electromagnetic energy propagated through the casing from a source external to the casing, wherein the receiver has a permeable core and a main winding thereabout, a method of reducing attenuation of the measurable total magnetic field that is otherwise caused by a casing effect arising from mutual coupling of the core with the casing, said method comprising the steps of:

Incorporating a feedback means with the magnetic receiver, the feedback means including an operational amplifier, the main winding being coupled with an input of the amplifier; and operating the receiver with the feedback means to drive a feedback current from the amplifier to the receiver and around the core in a direction opposite the direction from the main winding to the input of the amplifier, thereby reducing the casing effect and reducing attenuation of the measurable total magnetic field.

21. The method of claim 20, wherein the measurable total magnetic field includes a primary magnetic field and a secondary magnetic field inside the core that generally opposes the primary magnetic field, thereby attenuating the measurable total magnetic field, and wherein the step of operating the receiver includes reducing at least a portion of the total magnetic field, thereby reducing attenuation of the measurable magnetic field.

22. The method of claim 21, wherein the step of operating the receiver includes canceling at least a portion of the total magnetic field by canceling at least a portion of the secondary magnetic field.

23. The method of claim 21, wherein the step of operating the receiver includes driving the feedback current through the main winding to generate a magnetic field generally opposing the secondary magnetic field, thereby reducing the secondary magnetic field.

24. The method of claim 22, wherein the feedback means includes a secondary winding about the core, the step of operating the receiver includes driving the feedback current in a feedback direction through the secondary winding to generate a magnetic field generally opposing the secondary magnetic field, thereby reducing the secondary magnetic field.

25. The method of claim 21, wherein the feedback mean includes a secondary winding about the core, and the step of driving the feedback current output includes driving the feedback current through the secondary winding in a direction opposite the direction from the winding to the input to the amplifier, thereby generating a magnetic field that generally opposes the secondary magnetic field.

26. The method of claim 21, wherein the step of operating the receiver to drive the feedback current includes driving the feedback current through a feedback winding about the core such that the feedback current is generally proportional to the secondary magnetic field, and such that the induction coil operates as a null detector.

27. The method of claim 26, wherein the feedback winding is the main winding and a terminal of the main winding is coupled to the input to the amplifier, and the step of operating the receiver includes driving the feedback current through the main winding in a direction from the input of the amplifier, through the terminal and through the main winding.

28. A method of determining the attenuation change characteristic of a conductive wellbore casing, said method comprising the steps of: positioning, inside the casing, a magnetic receiver having an induction coil of a permeable core and a main winding wound thereabout, and a feedback means operably coupled with the induction coil;

generating electromagnetic energy externally of the casing and directing the electromagnetic energy so as to propagate through the casing, whereby a measurable total magnetic field inside the casing is measurable at an attenuated state due to a casing effect, the casing effect resulting from the interaction between the casing and the permeable core;

operating the receiver in a feedback mode, such that the feedback means operate to reduce the casing effect from the interaction between the casing and the core and to reduce attenuation associated with the casing effect, and to measure a measurable total magnetic field inside the casing with reduced attenuation;

measuring the measurable total magnetic field inside the casing at an attenuated state; and determining the attenuation change attributable to the casing by comparing the measured value of the measurable total magnetic field in the attenuated state with the measured value of the measurable total magnetic field with reduced attenuation.

29. The method of claim 28, wherein the step of measuring the measurable total magnetic field inside the casing at an attenuated state includes operating a second magnetic receiver positioned inside the wellbore casing, the second receiver having a non-magnetically permeable core.

30. The method of claim 28, wherein the step of measuring the measurable total magnetic field inside the casing at an attenuated state includes operating the magnetic receiver in a non-feedback mode, such that the feedback means does not operate to reduce the casing effect from the interaction between the casing and the core.

31. The method of claim 30, further comprising the steps of: repeating the step of generating electromagnetic energy at a plurality of frequencies; and at each of the plurality of frequencies, repeating the steps of, operating the receiver in a feedback mode, operating the receiver in a non-feedback mode, and determining the attenuation change.

32. The method of claim 31, further comprising the steps of:

modeling the attenuation change response of the casing and receiver combination, and generating an actual attenuation response curve by repeating the step of generating electromagnetic energy at a plurality of frequencies; and at each of the plurality frequencies, repeating the steps of, operating the receiver in a feedback mode, operating the receiver in a non-feedback mode, and determining the attenuation change.

33. The method of claim 31, wherein the step of generating electromagnetic energy generates a measurable total magnetic field inside the casing that includes a primary magnetic field and a secondary magnetic field inside the core that generally opposes the primary magnetic field, and wherein the step of operating the receiver in a feedback mode includes driving a feedback current about the core in a direction such that a magnetic field is generated that generally opposes the secondary magnetic field.

34. The method of claim 28, wherein the step of generating electromagnetic energy includes directing the electromagnetic energy so as to propagate through the casing at a frequency between about 1 Hz and about 1000 Hz.

35. In a method of employing a magnetic receiver positioned within a conductive casing to measure an inducing magnetic field therein, wherein the receiver has a permeable core and a main winding thereabout, a method of reducing attenuation of the magnetic field that is otherwise caused by a mutual coupling of the core with the casing, said method comprising the steps of:

providing the magnetic receiver with a feedback means including a secondary winding positioned about the core and an operational amplifier;

coupling the secondary winding with the amplifier; and feeding an output signal from the amplifier to the secondary winding to drive a feedback current therethrough, whereby the feedback current is generally linearly proportional to the magnetic field, thereby substantially canceling or reducing a secondary magnetic field caused by the mutual coupling of the core and the casing field.

36. The method of claim 35, further comprising the step of coupling a filter with the amplifier, wherein the step of feeding an output signal includes feeding an output signal from the filter.

37. The method of claim 35, wherein the step of driving the feedback current through the secondary winding includes driving the feedback current such that a core flux generated by the second winding is generally in opposition to a core flux generated by an external field, so as to substantially cancel the secondary field within the core.

* * * * *